United States Patent
Bokelberg et al.

(10) Patent No.: US 9,764,223 B2
(45) Date of Patent: *Sep. 19, 2017

(54) CONDUCTING CHALLENGE EVENTS

(71) Applicant: International Business Machines Corporation, Armonk, NY (US)

(72) Inventors: Eric H. Bokelberg, Colchester, VT (US); Blain A. Dillard, Cary, NC (US); David A. Hoffman, Raleigh, NC (US); Patrick Howard, Charlotte, NC (US); Brian T. Paulsen, Overland Park, KS (US); Jose A. Tano, Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,068

(22) Filed: Mar. 15, 2016

(65) Prior Publication Data

US 2016/0193526 A1    Jul. 7, 2016

Related U.S. Application Data

(63) Continuation of application No. 14/454,185, filed on Aug. 7, 2014, now Pat. No. 9,327,197, which is a (Continued)

(51) Int. Cl.
*A63F 13/12* (2006.01)
*A63F 9/06* (2006.01)
*G06Q 10/06* (2012.01)
*G06Q 10/10* (2012.01)
*A63F 13/30* (2014.01)

(52) U.S. Cl.
CPC ............ *A63F 9/0612* (2013.01); *A63F 13/12* (2013.01); *A63F 13/30* (2014.09); *G06Q 10/06311* (2013.01); *G06Q 10/101* (2013.01)

(58) Field of Classification Search
CPC ...................................................... A63F 13/10
See application file for complete search history.

(56) References Cited

U.S. PATENT DOCUMENTS 5,004,232 A * 4/1991 Wong ..................... A63F 13/10
                                                            273/148 B
5,724,521 A    3/1998 Dedrick
(Continued)

OTHER PUBLICATIONS

Zhou et al., Modeling Network Intrusion Detection Alerts for Correlation, ACM Transaction on Information and System Security, vol. 10, No. 1, Article 4, Feb. 2007, pp. 1-31.
(Continued)

*Primary Examiner* — Omkar Deodhar
(74) *Attorney, Agent, or Firm* — Schmeiser, Olsen & Watts, LLP; John R. Pivnichny

(57) ABSTRACT

A method and system for conducting a challenge event. The challenge event is communicated to at least two participants in a form of an event specification, in response to receipt of a request for the challenge event from a client computer. A proposal for a solution that meets the event specification is received from each participant of the at least two participants. Only one participant is chosen from the at least two participants, based on the proposal previously received from each participant.

11 Claims, 3 Drawing Sheets

Related U.S. Application Data continuation of application No. 13/013,478, filed on Jan. 25, 2011, now Pat. No. 9,199,172.

(56) References Cited

U.S. PATENT DOCUMENTS

| | | | |
|---|---|---|---|
| 5,974,409 | A | 10/1999 | Sanu et al. |
| 5,987,446 | A | 11/1999 | Corey et al. |
| 6,285,987 | B1 | 9/2001 | Roth et al. |
| 6,397,228 | B1 | 5/2002 | Lamburt et al. |
| 6,484,161 | B1 | 11/2002 | Chipalkatti et al. |
| 6,496,843 | B1 | 12/2002 | Getchius et al. |
| 6,569,012 | B2 | 5/2003 | Lydon et al. |
| 6,761,631 | B2 | 7/2004 | Lydon et al. |
| 6,824,462 | B2 | 11/2004 | Lydon et al. |
| 6,984,177 | B2 | 1/2006 | Lydon et al. |
| 7,035,809 | B2 | 4/2006 | Miller et al. |
| 7,062,449 | B1 | 6/2006 | Clark |
| 7,139,999 | B2 | 11/2006 | Bowman-Amuah |
| 7,225,142 | B1 | 5/2007 | Apte et al. |
| 7,292,990 | B2 | 11/2007 | Hughes |
| 7,300,346 | B2 | 11/2007 | Lydon et al. |
| 7,311,595 | B2 | 12/2007 | Lydon et al. |
| 7,401,031 | B2 | 7/2008 | Hughes |
| 7,711,755 | B2 | 5/2010 | Cruver |
| 7,778,866 | B2 | 8/2010 | Hughes |
| 2003/0192029 | A1 | 10/2003 | Hughes |
| 2007/0198558 | A1 | 8/2007 | Chen |
| 2008/0127093 | A1 | 5/2008 | Fernandez-Ivern et al. |
| 2008/0167960 | A1 | 7/2008 | Hughes |
| 2010/0023918 | A1 | 1/2010 | Bernardini et al. |
| 2010/0299650 | A1 | 11/2010 | Abrahamsen et al. |
| 2014/0349767 | A1 | 11/2014 | Bokelberg et al. |
| 2014/0349768 | A1 | 11/2014 | Bokelberg et al. |

OTHER PUBLICATIONS

S. Degwekar et al., Event-Triggered Data and Knowledge Sharing Among Collaborating Government Organizations, ACM International Conference Proceeding Series, vol. 228: Proceedings of the 8th Annual International Digital Government Research Conference, Philadelphia, PA, May 20-23, 2007, pp. 102-111.
Notice of Allowance (mail date Jun. 23, 2014) for U.S. Appl. No. 13/013,478, filed Jan. 25, 2011, Conf. No. 8815.
Office Action (mail date Apr. 2, 2014) for U.S. Appl. No. 13/013,478, filed Jan. 25, 2011, Conf. No. 8815.
Amendment (filed Mar. 6, 2014) for U.S. Appl. No. 13/013,478, filed Jan. 25, 2011, Conf. No. 8815.
Office Action (mail date Sep. 6, 2014) for U.S. Appl. No. 13/013,478, filed Jan. 25, 2011, Conf. No. 8815.
RCE (filed Jun. 26, 2013) for U.S. Appl. No. 13/013,478, filed Jan. 25, 2011, Conf. 8815.
Notice of Allowance (mail date Jun. 7, 2013) for U.S. Appl. No. 13/013,478, filed Jan. 25, 2011, Conf. No. 8815.
RCE (filed May 10, 2013) for U.S. Appl. No. 13/013,478, filed Jan. 25, 2011, Conf. No. 8815.
Petition Decision to withdraw from Issue (mail date Mar. 7, 2013) for U.S. Appl. No. 13/013,478, filed Jan. 25, 2011, Conf. No. 8815.
Notice of Allowance (mail date Dec. 6, 2012) for U.S. Appl. No. 13/013,478, filed Jan. 25, 2011, Conf. No. 8815.
RCE (filed Oct. 18, 2012) for U.S. Appl. No. 13/013,478, filed Jan. 25, 2011, Conf. No. 8815.
Notice of Allowance (mail date Jul. 19, 2012) for U.S. Appl. No. 13/013,478, filed Jan. 25, 2011, Conf. No. 8815.
Amendment (filed Jun. 3, 2012) for U.S. Appl. No. 13/013,478, filed Jan. 25, 2011, Conf. No. 8815.
Office Action (mail date Feb. 2, 2012) for U.S. Appl. No. 13/013,478, filed Jan. 25, 2011, Conf. No. 8815.
Withdrawal of Notice of Allowance (Nov. 28, 2011) for U.S. Appl. No. 13/013,478, filed Jan. 25, 2011, Conf. No. 8815.
Notice of Allowance (mail date Nov. 14, 2011) for U.S. Appl. No. 13/013,478, filed Jan. 25, 2011, Conf. No. 8815.
Amendment (filed Sep. 28, 2011) for U.S. Appl. No. 13/013,478, filed Jan. 25, 2011, Conf. No. 8815.
Office Action (mail date Jun. 28, 2011) for U.S. Appl. No. 13/013,478, filed Jan. 25, 2011, Conf. No. 8815.
U.S. Appl. No. 14/455,974, filed Aug. 11, 2014, Conf. No. 5376.
Notice of Allowance mail date Aug. 22, 2014 for U.S. Appl. No. 13/013,478, filed Jan. 25, 2011, Conf. No. 8815.
Office Action (Mar. 5, 2015) for U.S. Appl. No. 13/013,478, filed Jan. 25, 2011, Conf. No. 8815.
Amendment (Jun. 5, 2015) for U.S. Appl. No. 13/013,478, filed Jan. 25, 2011, Conf. No. 8815.
Office Action (Sep. 1, 2015) for U.S. Appl. No. 14/455,974, filed Aug. 11, 2014, Conf. No. 5376.
Amendment (Dec. 1, 2015) for U.S. Appl. No. 14/455,974, filed Aug. 11, 2014, Conf. No. 5376.
Notice of Allowance (Jul. 24, 2015) for U.S. Appl. No. 13/013,478, filed Jan. 25, 2011, Conf. No. 8815.
Office Action (Aug. 24, 2015) for U.S. Appl. No. 14/454,185, filed Aug. 7, 2014, Conf. No. 2192.
Amendment (Nov. 23, 2015) for U.S. Appl. No. 14/454,185, filed Aug. 7, 2014, Conf. No. 2192.
Notice of Allowance (Feb. 5, 2016) for U.S. Appl. No. 14/454,185, filed Aug. 7, 2014, Conf. No. 2192.
Notice of Allowance (Feb. 5, 2016) for U.S. Appl. No. 14/455,974, filed Aug. 11, 2014, Conf. No. 5376.
Wikipedia, Jeopardy, Final Jeopardy, at least as early as Jan. 25, 2011, 25 pages.

* cited by examiner

CONDUCTING CHALLENGE EVENTS

This application is a continuation application claiming priority to Ser. No. 14/454,185, filed Aug. 7, 2014, now U.S. Pat. No. 9,327,197, issued May 3, 2016, which is a continuation of Ser. No. 13/013,478, filed on Jan. 25, 2011, U.S. Pat. No. 9,199,172, issued Dec. 1, 2015.

BACKGROUND

The present application relates to the field of computers, and specifically to the use of computers in management of software design, coding and other work events, normally used in building software applications. Even more particularly, the present invention relates to the use of computers in creating events, scoring submitted designs and code, and rewarding event participants for submissions that meet an acceptance criteria.

BRIEF SUMMARY

A computer implemented apparatus and computer program product provides design, coding, and other work challenge events and competition events associated with building a software application. The apparatus includes a portal for communicating the events to potential participants and receives computer software designs and code submissions from selected participants. An event manager server creates the events. The apparatus includes a catalog of reusable code assets and a pricing calculator on the event manager server for pricing the event based on use of the catalog and based on results of previous events as determined by an analytics engine. Participants are selected using a selector subsystem. Computer code submitted by the selected participants is executed in a challenge server layer and also evaluated and scored. A design event may require creation of a formal document or use of a design tool such a Rational Software Architect available from International Business Machines Corporation of Armonk, N.Y. A payment application rewards participants according to the event specifications and the scoring results or other outcome meets the event specifications and a minimum threshold scoring result.

A major benefit of the present invention is that challenge and competition events are completed in short cycles. Research has shown that work that is properly broken down to a consumable level can be completed with the highest chance of success. Although, any cycle time may be used with the present invention, typically events are conducted in short cycles, usually of three to seven days duration using work specifications that have been broken down to a consumable level.

DETAILED DESCRIPTION

Figure 1:
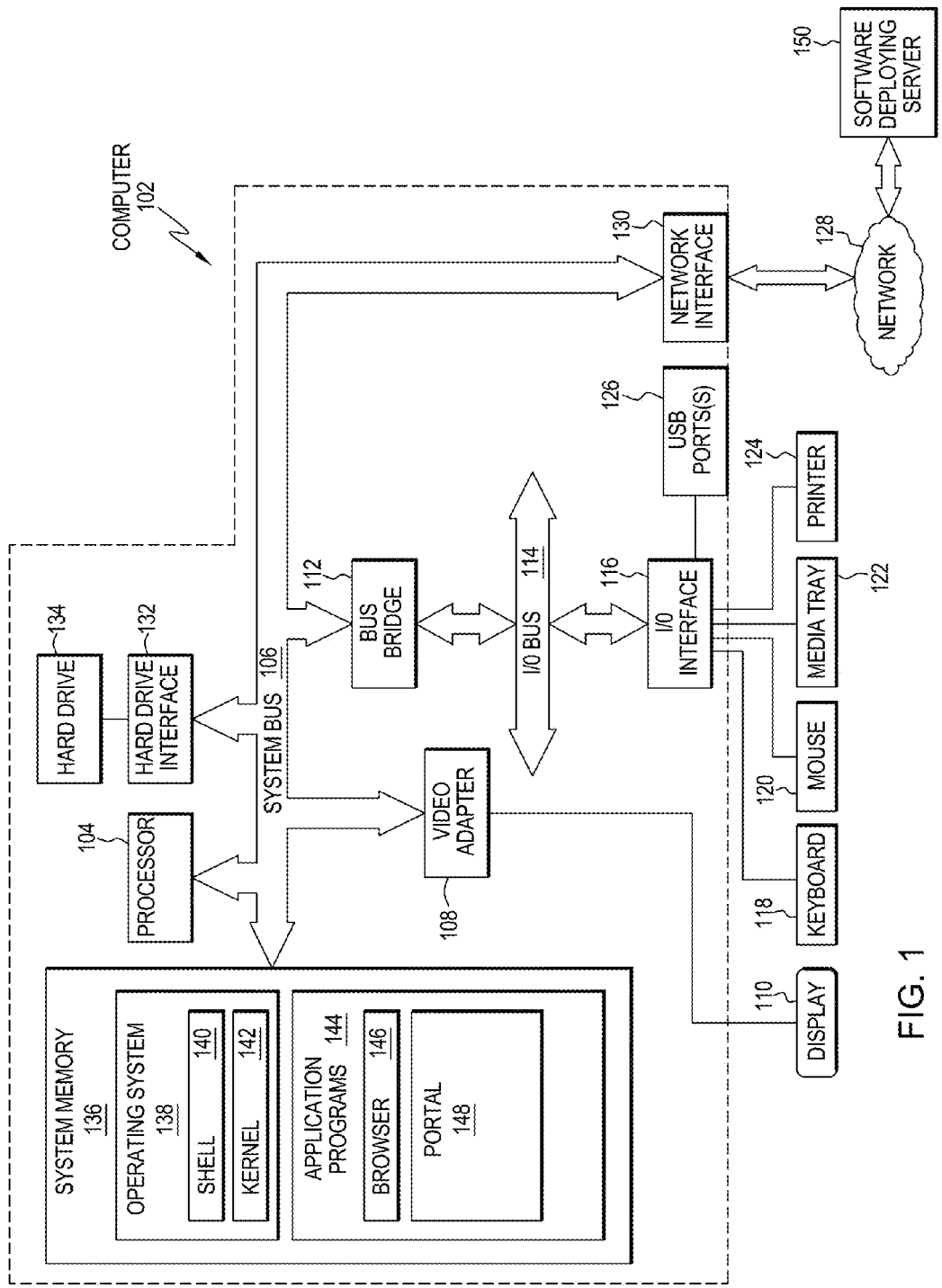
FIG. 1 depicts an exemplary computer in which the present invention may be implemented.

As will be appreciated by one skilled in the art, aspects of the present invention may be embodied as a system or computer program product. Accordingly, aspects of the present invention may take the form of an entirely hardware embodiment, and entirely software embodiment (including firmware, resident software, micro-code, etc.) or an embodiment combining software and hardware aspects that may all generally be referred to herein as an "apparatus" "module" or "system." Furthermore aspects of the present invention may take the form of a computer program product embodied in one or more computer readable storage mediums(s) having computer readable program code embodied thereon.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a portal 148. Portal 148 includes code for implementing the processes described below, including those described in FIGS. 2-3. In one embodiment, computer 102 is able to download portal 148 from software deploying server 150, including in an on-demand basis, wherein the code in portal 148 is not downloaded until needed for execution to define and/or implement the invention described herein. In other embodiments, the portal is a web based application that is accessed from a client computer over a network using a web browser. Note further that, in one embodiment of the present invention, software deploying server 150 performs all of the functions associated with the present invention, thus freeing computer 102 from having to use its own internal computing resources to execute portal 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2A:
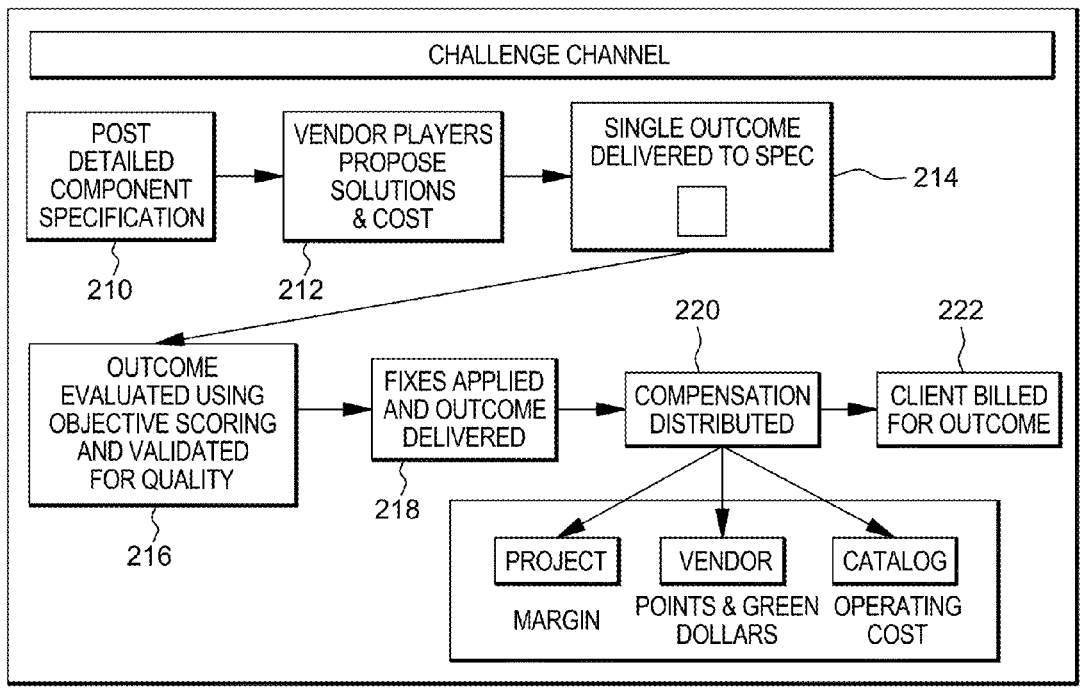
FIGS. 2*a* and 2*b* are block diagrams showing the progression of a challenge event and a competition event respectively.

In FIG. 2a, there is shown a block diagram depicting the progression of steps 210-222 performed during a challenge event.

In step 210 a detailed description of a challenge event is posted on a portal. A challenge event is also referred to as a component herein, and the detailed description is also referred to as a specification herein. The specification may include use of certain reusable code assets from a catalog posted on the portal. The specification also includes the results of a pricing calculator described below from an event manager server.

In step 212, participants (also referred to herein as vendor players) propose their respective solutions and terms such as cost, schedule, or approaches to provide a design or code their solution or provide another outcome based on the selected event. Participants may accept the price in the specification or propose a higher or lower price. Other terms from the specification may also be changed in their proposal. A single participant is then chosen for each challenge event using a selector subsystem (not shown). An important consideration in making the selection is each potential participant's digital reputation. In every previous event, participants are evaluated on reliability, i.e., did they submit and submit on time? They are scored on adherence to specifications using a standard scorecard with a 0-100 rating scale. Additional elements are also scored, including frequency of reuse from the catalog, the type of events the participant is working on, and how recent their event history is. All of these elements become part of the participant's digital reputation which is continuously maintained, updated, and available for use by the selector subsystem. Reliability of both submissions and wins may be displayed by month as a time line graph in a digital reputation display. The digital reputation of participants may be stored in a database accessible by the challenge server layer. After producing the work, the chosen single participant then delivers his solution in step 214.

In step 216, a challenge server layer in communication with the portal, evaluates submitted computer code. For example, a static analysis of submitted computer code may be performed. The code is validated for quality and evaluated using objective criteria, such as a published scorecard. If fixes are required, the participant applies the fixes in step 218. This process can iterate. Once the outcome (the submitted design or code) meets the specification and is validated for quality, it is accepted and is delivered to the client who originally requested the coding event.

In step 220, compensation is distributed to the participant. The submitted code is added to the catalog of reusable assets. Compensation may be a payment in actual dollars (green dollars), a credit of billable hour, digital reputation credit, or any other type of compensation known in the art and agreed to by the participant at the time the participant is chosen for the challenge coding. The client is then billed for the challenge event in step 222.

Figure 2B:
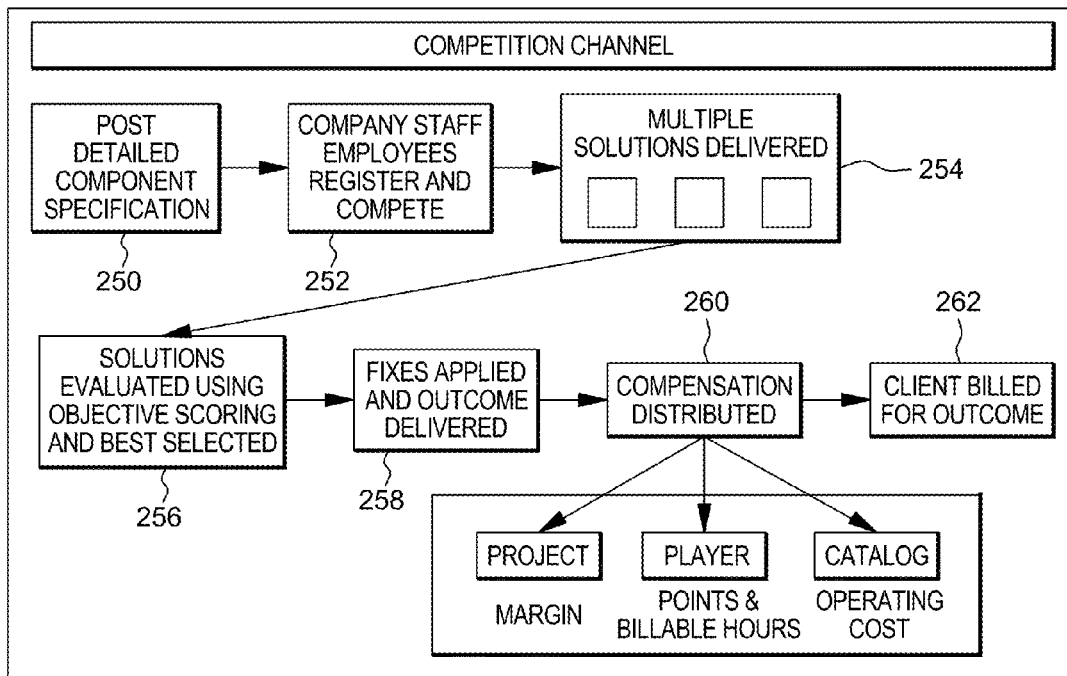

In FIG. 2*b*, the steps of a competition event are shown. In step 250, a detailed description (specification) of a competition event (component) is posted to the same portal used for challenge events as described above. The results from the same pricing calculator described above are included in the competition event specification.

In step 252, approved participants (company staff) register to provide their solutions to the specification. Some or all of the approved participants may be the same individuals who participant in challenge event as described above. Other limitations may be placed on who may be participants, for example, participant may be limited to employees of a particular company or employees who are temporarily unassigned to other projects. The approved participants deliver their solutions according to a time schedule in the specification, in step 254.

In step 256, each of the submitted code solutions for a competition is evaluated by performing a static analysis of the submitted computer code. The quality is validated and each solution is scored using a published scorecard. A single best solution is selected as the winner of the competition. A second place winner may also be selected. Other winners may also be selected according to the competition event description.

If fixes are needed they are applied in step 258 and the winning software design or computer code is delivered to the client who requested the competition be held.

Compensation is distributed in step 260. If more than one winner is selected, then more than one participant my receive compensation. As above, the compensation may be in the form of green dollars, billable hours credit, or any other form of compensation. The first place wining solution is added to the catalog of reusable assets.

In step 262, the client is billed for the outcome (first place winning software design or computer code).

Figure 3:
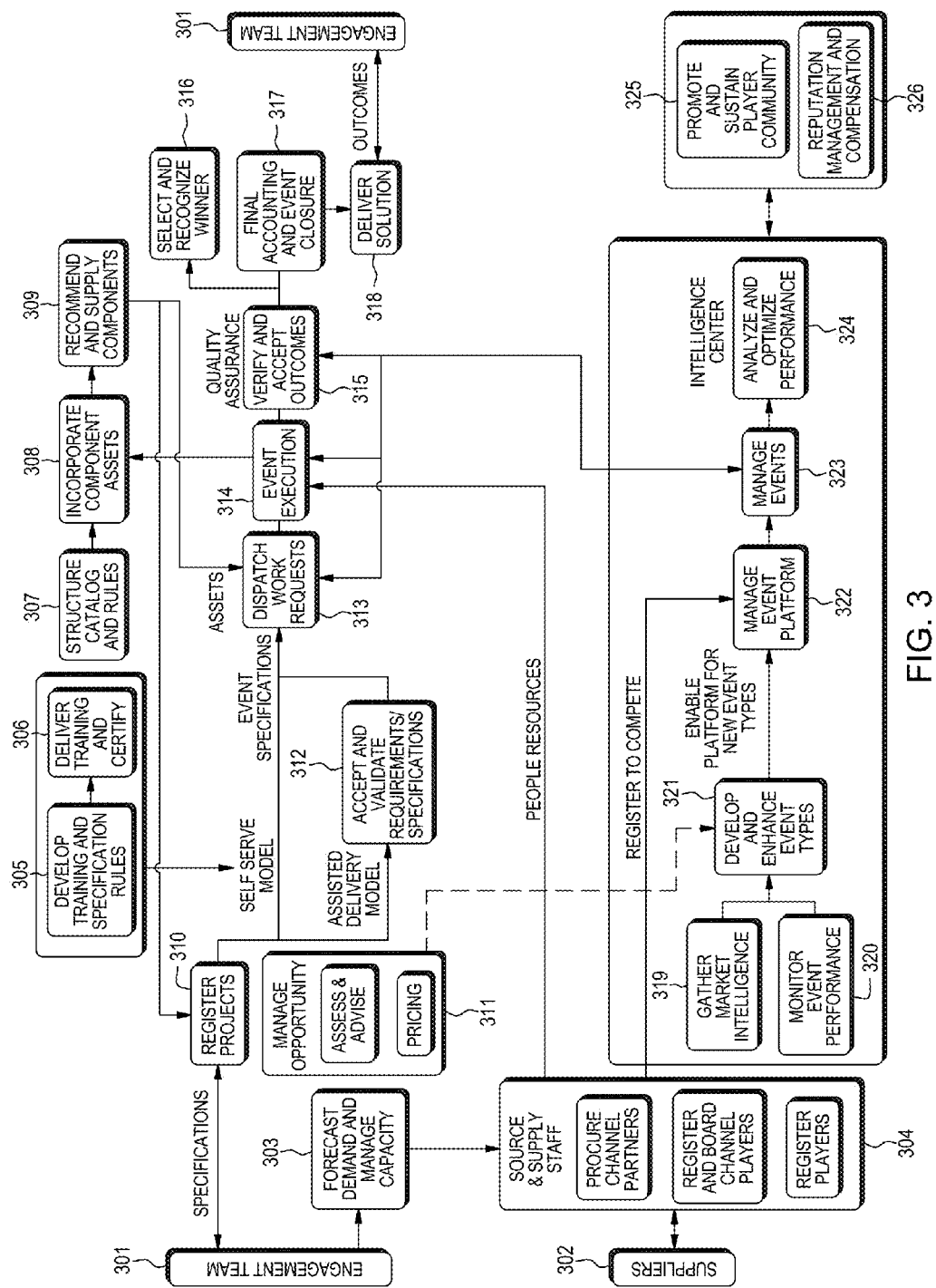
FIG. 3 is a block diagram of one embodiment of the present invention.

In FIG. 3, there is shown a system block diagram of the present invention. An engagement team 301 operates the system on behalf of one or more clients. The system includes an event manager server for creating the events. The engagement team uses block 303 to forecast demand for events and manage capacity by sourcing and supplying staff 304 for managing events. This may include procuring channel partners, as well as registering participants from suppliers 302, for both challenge events and competition events in block 324. Outcomes are delivered to clients by engagement team 301 from block 318.

Rules for event specifications are developed and event staff trained using blocks 305 and 306 respectively.

A catalog of reusable assets is structured in block 307. After each event, the delivered solution is added to the catalog in block 308. Other code assets may be added in block 309.

A project comprising one or more events is registered by block 310. The event includes the results of pricing calculator 311 described below. The requirements in the specification of an event are validated in block 312. However, block 312 may be bypassed by an event leader who is certified to operate events without assistance.

An event proceeds by dispatching a work request in block 313 and is executed in block 314 by event manager 323. In block 315, solutions are executed, evaluated for quality, and scored.

Selector subsystem 316 selects a winner for competition events. Final accounting, including compensating the participants(s) and billing the client, is preformed in block 317. The solution is delivered to the client using block 318 by engagement team 301.

The performance of the entire system is continually improved by gathering market intelligence in block 319 and by monitoring event performance in block 320. Additional event types may be developed in block 321. The event platforms, including the portal, the pricing calculator, and catalog, are managed in block 322. In block 324, overall performance of the system is analyzed and optimized.

In block 325, the community of participants is promoted. In block 326, the reputation of the participants is managed and its various compensation methods reviewed for improvement.

Pricing calculator 311 is an integrated capability of the event manager server that allows the client or event sponsor to enter characteristics about the event, such as the number of components, use case scenarios, or screens, and receive recommendations for sizing the event based on analytics captured from previous events. Pricing calculator 311 provides a total price for running the event based on size and components from reusable asset catalog 309. Correctly sizing an event is very important to getting participants to register to work on the event.

As noted above, blocks 303 and 304 are important elements and are important features in managing events. A recommendation engine in the portal uses business analytics techniques to manage supply and demand, and to make recommendations for current and future events. Some of the data elements which may be captured by the recommendation engine include:

event type and technology platform
event duration
event value in points, hours, and dollars
assets specified
number of business rules, use cases, classes, or objects in event specification
event registrants and digital reputations
submission scores
assets reused by participants
scores of delivered solutions The recommendation engine uses this comprehensive outcome level data with business analytics techniques to provide:
- recommendations of participants who would be expected to perform well in an event
- recommendations for participants of events that they should consider registering for
- recommendations for participants of assets that may help them deliver an outcome more efficiently
- success prediction of likelihood of a successful outcome based on event parameters
- identifying changes to skills or resources 304 needed to meet forecasted demand for outcomes
- alerts for troubled events Various business analytics techniques known in the art may be used such as, but not limited to, computer algorithms in which the parameters are continuously adjusted based on current outcomes, or static models developed from historical data.

The present invention is also used to produce other types of outcomes to support the software development and support lifecycle. These other outcomes are required elements on projects where software code and design is being produced, and therefore, the computer system (portal application) supports the delivery of these additional accessory outcome types in order to assemble a working software system. The portal application allows for a selection on event type, with multiple choices for the different types of software project outcomes represented. The portal allows for outcomes to be requested in the areas of test case creation, test case execution, system architecture deliverables, graphic designs, software component assembly, and idea generation. The scoring method for these types of outcomes is consistent with coding and design events, but the scorecard used and the evaluation criteria are specific to the type of outcome.

While there have been shown and described what are at present considered the preferred embodiments of the invention, it will be obvious to those skilled in the art that various changes and modifications may be made therein without departing from the scope of the invention as defined by the appended claims. For example, it will be obvious that some steps shown sequentially may be performed in parallel.

What is claimed is:

1. A method for obtaining, from conducting a challenge event, a computer code that supports software development for a client computer via use of a computer system comprising an apparatus, wherein the apparatus comprises a processor and a read-only memory (ROM) hard-wired into the apparatus, wherein the ROM contains program code, which, upon being executed by the processor, implements the method, and wherein the apparatus is a special purpose machine specific to the method due to the ROM being hard wired into the apparatus, said method comprising:

in response to the processor receiving a request for the challenge event from the client computer, said processor communicating, to a plurality of participants, the challenge event in a form of an event specification;

said processor receiving from each participant of the plurality of participants a proposal for a solution that meets the event specification;

said processor choosing only one participant from the plurality of participants, said choosing based on the proposal previously received from each participant;

after said choosing the only one participant, said processor receiving the solution in a form of a computer code from the chosen only one participant;

said processor validating the received solution for quality and accepting the received solution; and in response to said validating and accepting the received solution, said processor delivering the received solution to the client computer, said received solution configured to be used by the client computer to support software development for the client computer.

2. The method of claim 1, said method comprising:
said processor executing the computer code;
said processor evaluating the computer code; and
said processor scoring the solution.

3. The method of claim 2, said method comprising:
said processor implementing a payment application for paying the chosen only one participant after the solution in the form of the computer code has been received and evaluated and after the solution has been scored.

4. The method of claim 1, wherein the communicated challenge event is a present challenge event, and wherein said choosing comprises choosing only one participant for the present challenge event by determining a digital reputation score for each participant and choosing the only one participant having the highest digital reputation score, wherein the digital reputation score for each participant is based on each participant's performance on previous challenge events that preceded the present challenge event.

5. The method of claim 4, wherein the digital reputation score for each participant includes a score for: (i) each participant's frequency of reuse of reusable code assets in a catalog of reusable code assets for the previous challenge events, (ii) the type of the previous challenge events that each participant worked on, and (iii) how recent the previous challenge events are for each participant.

6. The method of claim 1, wherein the method further comprises:
said processor executing a pricing calculator for pricing the challenge event; and
said processor executing an analytics engine for improving the pricing calculator over time based on past challenge events.

7. A computer program product, comprising a read-only memory (ROM) hard-wired into an apparatus that includes a processor, said ROM having computer readable program code stored therein, said program code containing instructions which, upon being executed by the processor, implement a method for obtaining, from conducting a challenge event, a computer code that supports software development for a client computer, said apparatus being a special purpose machine specific to the method due to the ROM being hard wired into the apparatus, said method comprising:

in response to the processor receiving a request for the challenge event from the client computer, said processor communicating, to a plurality of participants, the challenge event in a form of an event specification;

said processor receiving from each participant of the plurality of participants a proposal for a solution that meets the event specification;

said processor choosing only one participant from the plurality of participants, said choosing based on the proposal previously received from each participant;

after said choosing the only one participant, said processor receiving the solution in a form of a computer code from the chosen only one participant;

said processor validating the received solution for quality and accepting the received solution; and in response to said validating and accepting the received solution, said processor delivering the received solution to the client computer, said received solution configured to be used by the client computer to support software development for the client computer.

8. The computer program product of claim 7, wherein the method further comprises:
said processor executing the computer code;
said processor evaluating the computer code; and
said processor scoring the solution.

9. The computer program product of claim 8, said method comprising:
said processor implementing a payment application for paying the chosen only one participant after the solution in the form of the computer code has been received and evaluated and after the solution has been scored.

10. A computer system comprising an apparatus, said apparatus comprising a processor and a read-only memory (ROM) hard-wired into the apparatus, said ROM containing program code which, upon being executed by the processor, implements a method for obtaining, from conducting a challenge event, a computer code that supports software development for a client computer, said apparatus being a special purpose machine specific to the method due to the ROM being hard wired into the apparatus, said method comprising:
in response to the processor receiving a request for the challenge event from the client computer, said processor communicating, to a plurality of participants, the challenge event in a form of an event specification;
said processor receiving from each participant of the plurality of participants a proposal for a solution that meets the event specification;
said processor choosing only one participant from the plurality of participants, said choosing based on the proposal previously received from each participant;
after said choosing the only one participant, said processor receiving the solution in a form of a computer code from the chosen only one participant;
said processor validating the received solution for quality and accepting the received solution; and
in response to said validating and accepting the received solution, said processor delivering the received solution to the client computer, said received solution configured to be used by the client computer to support software development for the client computer.

11. The computer system of claim 10, said method comprising:
said processor executing the computer code;
said processor evaluating the computer code; and
said processor scoring the solution.

* * * * *